United States Patent [19]

Wu

[11] Patent Number: 5,545,425
[45] Date of Patent: Aug. 13, 1996

[54] PROCESS FOR PREPARING A SHELF-STABLE, PACKAGED, BEAN-CONTAINING PRODUCT

[75] Inventor: Rei Young A. Wu, Palatine, Ill.

[73] Assignee: Hunt-Wesson, Inc., Fullerton, Calif.

[21] Appl. No.: 282,140

[22] Filed: Jul. 28, 1994

[51] Int. Cl.$^6$ .............................. A23B 9/00; A23L 1/20; A23L 3/00
[52] U.S. Cl. ........................ 426/634; 426/407; 426/629
[58] Field of Search ................................ 426/634, 407, 426/629

[56] References Cited

U.S. PATENT DOCUMENTS

| | | | |
|---|---|---|---|
| 4,729,901 | 3/1988 | Rockland et al. | 426/634 |
| 5,213,831 | 5/1993 | Leggott et al. | 426/634 |
| 5,296,253 | 3/1994 | Lusas et al. | 426/629 |

*Primary Examiner*—Esther M. Kepplinger
*Assistant Examiner*—Choon P. Koh
*Attorney, Agent, or Firm*—Pretty, Schroeder, Brueggemann & Clark

[57] ABSTRACT

The present invention relates to a process for preparing a shelf-stable, packaged, legume-containing product, said process comprising: (a) preconditioning dry legumes by contacting said dry legumes with a sufficient amount of an initial water source and for a sufficient period of time to produce pretreated legumes having a moisture content in the range of from about 15 wt. % to about 35 wt. %; (b) hydrating said pretreated legumes by contacting said pretreated legumes with a sufficient amount of a secondary water source for a sufficient period of time to produce hydrated legumes having a moisture content in the range of from about 35 wt. % to about 55 wt. %, wherein said secondary water source is at a temperature in the range of from about 60° C. to about 95° C.; (c) combining said hydrated legumes with a vehicle, thereby producing a legume-containing mixture comprising from about 10 wt. % to about 55 wt. % of said hydrated legumes and a balance of said vehicle; (d) charging said legume-containing mixture into a retortable vessel; (e) sealing said retortable vessel; and (f) heating said legume-containing mixture in said sealed retortable vessel in a retort operation carried out at a temperature in the range of from about 110° C. to about 130° C. for a period of time in the range of from about 20 minutes to about 150 minutes, thereby producing a shelf-stable, packaged legume-containing product. The present invention also relates to a shelf-stable, packaged, legume-containing product prepared by the above process.

17 Claims, No Drawings

PROCESS FOR PREPARING A SHELF-STABLE, PACKAGED, BEAN-CONTAINING PRODUCT

FIELD OF INVENTION

The present invention relates to a quick process for preparing a shelf-stable, packaged, bean-containing product. The present invention also relates to a shelf-stable, packaged, bean-containing product prepared by the process of the present invention.

BACKGROUND OF INVENTION

Beans are an excellent source of proteins, carbohydrates, lipids, vitamins and minerals, and as such are a highly nutritious and important part of the human diet. In the United States, beans are consumed primarily in the cooked and canned state. Cooking and canning the beans provides numerous advantages. For example, cooked beans are easier to digest than raw beans. Also, canned beans are shelf stable and can be stored for long periods of time. Additionally, cooked and canned beans are often mixed with sauces, such as tomato sauce when sold as pork and beans, and in chili preparations. These sauce-containing, cooked bean products are especially popular, due primarily to their taste.

However, as with many cooked products, special measures must be taken to provide cooked beans having a desirable texture and appearance. One such measure is to hydrate the beans prior to cooking. Beans which are not hydrated tend to take longer to cook and often the skin of the bean cracks, producing an unappealing product. The three major methods used to hydrate beans are: soaking beans for 8–16 hours at room temperature; blanching beans in hot water, typically 180°–212° F., for 20–40 minutes; and high-temperature, short-time steam infusion for 20–30 minutes. Unfortunately, each of these different methods have various drawbacks. For example, soaking beans for 8–16 hours is a very time-intensive operation. Furthermore, both blanching beans in hot water and subjecting the beans to a high-temperature, short-time steam infusion are both energy intensive, as well as being somewhat time intensive. Thus it would be desirable to devise a method of hydrating beans which is not time intensive and not energy intensive. The present invention provides such a process.

BACKGROUND ART

The art discloses methods for processing and treating beans and other legumes.

The article entitled *Strategies and Procedures for Processing Dry Beans*, M. A. Uebersax, S. Ruengsakulrach, and L. G. Occena, *Food Technology*, 45(9) 104–111, (1991), discloses methods for cooking and canning beans. According to the article, beans are generally prepared by commercial food processing operations and consumed as canned beans in tomato sauce. Beans may also be processed in water, brine, or molasses. Beans to be processed should contain a moisture level of about 12 to 16% and be of uniform size, fully-mature, and free from foreign materials and seed coat defects. Dry beans have been traditionally soaked for 8 to 16 hr. at room temperature or soaked (blanched) in a high temperature, short-time soaking process using high temperatures, 82°–100° C., for 20–40 minutes. Hot water hydration can be accomplished using either cereal rotator blanchers with differential temperatures or with continuous pipe blanchers. Either procedure is designed to provide beans with a final moisture range of 53–57%. The high temperature, short time soaking (blanching) is generally preferred, since it reduces labor costs, reduces floor space requirements, provides continuous flow and more readily controlled production schedules, and reduces potential bacteriological problems which may occur during a long soaking period. Furthermore, substantial solid losses with concomitant wash effluents are generated during blanching. Alternative methods designed to accelerate hydration and tenderization of beans, including vacuum, ultrasonic sound, the use of soak water additives, and gamma irradiation, are also attached. The article also discusses canning methods as well.

U.S. Pat. No. 4,729,901, issued Mar. 8, 1988, to Rockland et al., discloses a process for preparing canned legumes. The disclosed process comprises the steps of first providing an aqueous hydrating medium capable of imparting quick cooking properties to the legumes. The medium contains of about 1–3% by weight sodium chloride and a mixed carbonate/bicarbonate buffer to maintain the medium at a pH of about 8 to 9.5. The dry legumes are next soaked in the aqueous hydrating medium for a period of time of about ½ hour to 4 hours. This period of time is equal to between about 7% and about 30% of the time in the medium that would be necessary to render the legumes fully quick cooking. The soaked legumes are then next hermetically sealed in a container with a liquid different from the hydrating medium. Finally, the container containing the legumes and the liquid is thoroughly processed in a still retort until the legumes are cooked and commercially sterilized.

U.S. Pat. No. 4,867,996, issued Sep. 19, 1989, to Twyman, discloses a method of preparing fresh green beans for fresh produce sales by slowing down deterioration of the beans to extend the shelf life. The method comprises the steps of: (a) immersing fresh green beans in water at a temperature and a time equivalent to about 32° to 38° F., for about 1 to 2¼ hours to clean the beans and slow down the normal deterioration of the beans; and (b) removing surface water from the beans at a temperature of about 40° to 44° F. to prepare the beans for sale in which the beans have an extended shelf life of at least 2 days.

U.S. Pat. No. 4,601,910, issued Jul. 22, 1986, to Saub, discloses a process for cooking soybeans. The process comprises: (a) soaking the soybeans whole with hulls intact in a first aqueous solution of the juice of at least 1 fruit selected from the group consisting of guava, papaya, pineapple, apple and orange, in a plastic vessel to substantially soften said soybeans, the concentration of said juice in said first aqueous solution ranging from about 1% to about 20% by volume; (b) boiling said first aqueous solution with said soybeans soaking therein for at least about 15 minutes until the hulls are subsequently loosened from said soybeans; (c) recovering said soybeans from said first aqueous solution substantially free of hulls; and (d) soaking said recovered soybeans substantially free of hulls in a second aqueous solution of the juice of the fruit selected from pineapple, apple, orange, peach, pear and apricot, the concentration of said juice in said second aqueous solution ranging from about 10% to about 20% by volume.

U.S. Pat. No. 3,869,556, issued Mar. 4, 1975, to Rockland et al., discloses a process for treating garbanzo beans to make them quick cooking while retaining the integrity of the beans and the seed coats thereof. The process consists of soaking raw garbanzo beans for about 24 hr. at ambient temperature and atmospheric pressure in an aqueous hydrating medium consisting solely of water, 2% sodium chloride, 0.375% sodium bicarbonate, and 0.125% sodium carbonate.

However, none of these references teach or suggest preparing a shelf-stable, packaged, bean-containing product by a method that is neither energy nor time intensive. It is therefore an object of the present invention to provide such a method for preparing such a shelf-stable, packaged, bean-containing product. It is a further object of the present invention to provide such a method that is not dependent upon additional agents such as sodium carbonate or sodium bicarbonate. These objects are accomplished by the present invention.

SUMMARY OF THE INVENTION

The present invention relates to a process for preparing a shelf-stable, packaged, legume-containing product, said process comprising:

(a) preconditioning dry legumes by contacting said dry legumes with a sufficient amount of an initial water source and for a sufficient period of time to produce pretreated legumes having a moisture content in the range of from about 15 wt. % to about 35 wt. %;

(b) hydrating said pretreated legumes by contacting said pretreated legumes with a sufficient amount of a secondary water source for a sufficient period of time to produce hydrated legumes having a moisture content in the range of from about 35 wt. % to about 55 wt. %, wherein said secondary water source is at a temperature in the range of from about 60° C. to about 95° C.;

(c) combining said hydrated legumes with a vehicle, thereby producing a legume-containing mixture comprising from about 10 wt. % to about 55 wt. % of said hydrated legumes and a balance of said vehicle;

(d) charging said legume-containing mixture into a retortable vessel;

(e) sealing said retortable vessel; and (f) heating said legume-containing mixture in said sealed retortable vessel in a retort operation carried out at a temperature in the range of from about 110° C. to about 130° C. for a period of time in the range of from about 20 minutes to about 150 minutes, thereby producing a shelf-stable, packaged legume-containing product.

The present invention also relates to a shelf-stable, packaged, legume-containing product prepared by the above process.

DETAILED DESCRIPTION OF THE INVENTION

The present invention relates to a process for preparing a shelf-stable, packaged, legume-containing product. In the process of the present invention, dry legumes are preconditioned to produce pretreated legumes. The dry legumes used in the present invention may be of any variety known to those skilled in the art as for being useful for preparing shelf-stable, packaged, legume-containing products. Examples of legumes useful herein include, but are not limited to: peas; soybeans; sweet peas; lentils; beans, including without limitation beans of the genus phaseolus, common beans such as large white, small white, pinto, red kidney, cranberry, lima, black, and the genus vigna, including black eye beans; and mixtures thereof. Beans, lentils, soybeans, and mixtures thereof are preferred legumes, and beans and soybeans are more preferred.

The dry legumes are preconditioned by contacting them with a sufficient amount of an initial water source, for a sufficient period of time, to produce pretreated legumes having a moisture content in the range of from about 15 wt. % to about 35 wt. %, preferably from about 20 wt. % to about 30 wt. %, more preferably from about 22 wt. % to about 25 wt. %. As used herein, the term "initial water source" refers to any source of water moisture, and can include steam. The dry legumes can be contacted with the initial water source by any method known to those skilled in the art. Examples of useful methods include, but are not limited to, spraying, immersion, repeated dipping, misting, floating, diffusion, steam condensing, and mixtures thereof, with immersion, spraying, and mixtures thereof being preferred, and spraying being more preferred.

Of course, the amount of initial water source used and the period of time necessary for the dry legumes to be in contact with the initial water source to produce the pretreated legumes will vary depending upon the particular method used to contact the dry legumes with the initial water source. Generally, the ratio of initial water source to dry legumes in the preconditioning step is at least about 0.5:1, and is preferably in the range of from about 1:1 to about 10:1, more preferably from about 1.5:1 to about 5:1, still more preferably from about 1.5:1 to about 3:1 (initial water source: dry legumes). Also, generally the dry legumes are contacted with the initial water source for a period of time in the range of from about 1 to about 40 minutes, preferably from about 2 to about 20 minutes, more preferably from about 2 to about 10 minutes.

When the dry legumes are sprayed with the initial water source, the weight ratio of initial water source to dry legumes is at least about 0.8:1, and is preferably in the range of from about 1:1 to about 10:1, more preferably from about 2:1 to about 5:1, still more preferably from about 2:1 to about 3:1 (initial water source: dry legumes). The initial water source is allowed to stand on the sprayed dry legumes for a period of time in the range of from about 1 to about 30 minutes, preferably from about 2 to about 20 minutes, more preferably from about 2 to about 5 minutes. When the dry legumes are immersed in the initial water source, the weight ratio of initial water source to dry legumes is typically at least about 2:1, and is preferably in the range of from about 2.5:1 to about 10:1, more preferably from about 2.5:1 to about 5:1, still more preferably from about 3:1 to about 4:1 (initial water source: dry legumes). The dry legumes are immersed in the initial water source for a period of time typically in the range of from about 2 to about 35, preferably from about 2 to about 25, more preferably from about 3 to about 10 minutes.

Any water source known to those skilled in the art may be used for the initial water source of the process of the present invention. Preferably the initial water source comprises tap water, de-ionized water, distilled water, and mixtures thereof, with tap water being preferred. Care should be taken to avoid hard water having too great of a mineral content, with soft water being preferred. The initial water source preferably has a hardness in the range of from about 5 to about 100, more preferably from about 10 to about 60, still more preferably from about 20 to about 40 ppm calcium.

After the pretreated legumes have been prepared, they are then hydrated. The hydration is accomplished by contacting the pretreated legumes with a sufficient amount of a secondary water source, for a sufficient period of time, to produce hydrated legumes having a moisture content in the range of from about 35 wt. % to about 55 wt. %, preferably from about 40 wt. % to about 50 wt. %, still more preferably from about 43 wt. % to about 47 wt. %.

The pretreated legumes can be contacted with the secondary water source by any method known to those skilled in the art. Examples of useful methods include, but are not limited to, spraying, immersion, repeated dipping, misting, floating, diffusion, steam condensing, and mixtures thereof, with immersion, spraying, and mixtures thereof being preferred, and immersion being more preferred.

Of course, the amount of secondary water source used and the period of time necessary for the pretreated legumes to be in contact with the secondary water source to produce the hydrated legumes will vary depending upon the particular method used to contact the pretreated legumes with the secondary water source. Generally, the ratio of secondary water source to dry legumes in the preconditioning step is at least about 0.5:1, and is preferably in the range of from about 1:1 to about 10:1, more preferably from about 1.5:1 to about 5:1, still more preferably from about 1.5:1 to about 3:1 (secondary water source: dry legumes). Also, generally the dry legumes are contacted with the secondary water source for a period of time in the range of from about 1 to about 60 minutes, preferably from about 2 to about 40 minutes, more preferably from about 5 to about 20 minutes.

When the pretreated legumes are sprayed with the secondary water source, the weight ratio of secondary water source to pretreated legumes is at least about 0.8:1, and is preferably in the range of from about 1:1 to about 10:1, more preferably from about 2:1 to about 5:1, still more preferably from about 2:1 to about 3:1 (secondary water source: pretreated legumes). The secondary water source is allowed to stand on the sprayed pretreated legumes for a period of time in the range of from about 1 to about 45 minutes, preferably from about 2 to about 30 minutes, more preferably from about 5 to about 20 minutes. When the pretreated legumes are immersed in the secondary water source, the weight ratio of secondary water source to pretreated legumes is typically at least about 2:1, and is preferably in the range of from about 2.5:1 to about 10:1, more preferably from about 2.5:1 to about 5:1, still more preferably from about 3:1 to about 4:1 (secondary water source: pretreated legumes). The pretreated legumes are immersed in the secondary water source for a period of time typically in the range of from about 1 to about 50, preferably from about 5 to about 40, more preferably from about 5 to about 20 minutes.

Any water source known to those skilled in the art may be used for the secondary water source of the process of the present invention. Preferably the secondary water source comprises tap water, de-ionized water, distilled water, and mixtures thereof, with tap water being preferred. Care should be taken to avoid hard water having too great of a mineral content, with medium hardness water being preferred. The secondary water source preferably has a hardness in the range of from about 30 to about 260, more preferably from about 90 to about 240, still more preferably from about 150 to about 210 ppm calcium. It should also be noted that it is preferred that the initial water source not be used as the secondary water source. It is most preferred if soft water is used for preconditioning the dry legumes and medium hardness water be used for hydrating the pretreated legumes.

During the hydration step the secondary water source is maintained at a temperature in the range of from about 60° C. to about 95° C., preferably from about 70° C. to about 90° C., still more preferably from about 80° C. to about 85° C. The secondary water source may be maintained in this range by any means known to those skilled in the art. A non-limiting example of a useful method includes heating, with heating by steam injection being preferred. Steam injection provides heat and agitation, both of which are desirable in the process of the present invention.

After the hydrated legumes are produced, they are combined with a vehicle to produce a legume-containing mixture comprising from about 10 wt. % to about 55 wt. % preferably from about 20 wt. % to about 50 wt. %, more preferably from about 25 wt. % to about 45 wt. % hydrated legumes, and a balance of the vehicle. Of course, the concentration of legumes in the legume-containing mixture will depend upon the particular product being produced. Examples of legume-containing products that can be prepared by the process of the present invention include, but are not limited to, pork and beans, vegetarian beans, hot dogs and beans, chili with beans, baked beans, pre-cooked ingredient beans, bean salad, canned peas, and bean soups, with pork and beans, chili with beans, and baked beans being preferred.

When the legume-containing mixture is the preferred pork and beans, the mixture comprises from about 25 wt. % to about 55 wt. %, preferably from about 30 wt. % to about 50 wt. %, more preferably from about 35 wt. % to about 45 wt. % hydrated beans, and a balance of the vehicle; when the legume-containing mixture is the preferred baked beans, the mixture comprises from about 30 wt. % to about 55 wt. % preferably from about 35 wt. % to about 50 wt. %, more preferably from about 40 wt. % to about 50 wt. % hydrated beans, and a balance of the vehicle; when the legume-containing mixture is the preferred chili with beans, the mixture comprises from about 10 wt. % to about 40 wt. %, preferably from about 15 wt. % to about 30 wt. %, more preferably from about 20 wt. % to about 25 wt. % hydrated beans, and a balance of the vehicle. These legume-containing mixtures further comprise ingredients which are typically included in such mixtures. These type of ingredients, and their relative concentrations, will be known to one skilled in the art.

The term "vehicle," as used herein, refers to an edible medium that the hydrated legumes may be combined with. The vehicle can be any edible medium known to those skilled in the art. Furthermore, the vehicle may be a single component or ingredient, such as water, or may be a mixture of components or ingredients. Preferably, the vehicle is compatible with the particular hydrated legume being used. Examples of vehicles useful in the present invention include, but are not limited to, water, brine, a tomato-based sauce, chili sauce, barbecue sauce, smoke-flavored sauce, and baked bean sauce, with tomato-based sauce, chili sauce, and baked bean sauce being preferred. The phrase "tomato-based sauce," as used herein, refers to the sauce used to prepared products such as pork and beans, hot dogs and beans, and vegetarian beans. The composition of such tomato-based sauce will be appreciated by one skilled in the art. The phrase "chili sauce," as used herein, refers to the sauce used to prepare chili-type products when combined with beans. The composition of such chili sauce will also be appreciated by one skilled in the art. The phrase "baked bean sauce," as used herein, refers to the sauce used to prepare baked bean products when combined with beans. The composition of such baked bean sauce will also be appreciated by one skilled in the art.

The legume-containing mixture may additionally contain optional ingredients such as pork, beef, chicken, turkey, spices, flavoring agents, gums, starches, sugars, coloring agents, oils, salts, vegetables, cereals, and mixtures thereof. The concentration of each and all of these optional ingredients will depend upon the desired flavor profile of the final product, and will be appreciated by one skilled in the art.

The legume-containing mixture is prepared by combining the hydrated legumes with the vehicle, along with any desired optional ingredients. The ingredients may be combined in any manner known to those skilled in the art. For example, the ingredients can be combined separately and individually in an agitated, cylindrical tank and agitated until the ingredients are substantially uniformly dispersed throughout the legume-containing mixture. The legume-containing mixture is then charged into the retortable containers. Another method is to prepare the vehicle separate from the legumes and then meter both the vehicle and legumes into the individual retortable containers separately and independently.

After the legume-containing mixture is prepared, it is charged into a retortable vessel. The phrase "retortable vessel," as used herein, refers to a vessel which is capable of withstanding the temperature and time conditions of a retort operation. The retortable vessel may be any type suitable for retort processing. Examples of useful retortable vessels include, but are not limited to, tin plate cans with or without enamel linings or coating, aluminum cans, flexible or semi-rigid containers, glass bottles and jars, and plastic bowls with aluminum lids, with tin plate cans with or without enamel linings or coating, and the plastic bowls with aluminum lids being preferred.

After the legume-containing mixture is charged into it, the retortable vessel is sealed. After the retortable vessel is sealed, it is processed to cook the legumes and to sterilize its contents. This is accomplished be heating the retortable vessel, and the legume-containing mixture contained therein, at a sufficient temperature and for a sufficient period of time. The time and temperature requirements to achieve sterilization are dependent upon the legume-containing mixture being sterilized and the size, shape and composition of the retortable vessel, and the type of retort equipment used. There are numerous and extensive data available that describe the required conditions to achieve commercial sterilization for the legume-containing mixtures and retort vessels described herein. One skilled in the art will be able to determine the specific retort conditions required for the process of the present invention from such data.

Generally, the legume-containing mixture in the sealed retort vessel is heated at a temperature in the range of from about 110° C. to about 130° C., preferably from about 115° C. to about 125° C., more preferably from about 118° C. to about 122° C., for a period of time in the range of from about 20 to about 150, preferably from about 30 to about 120, more preferably from about 40 to about 85 minutes to achieve commercial sterility. When the legume-containing mixture is pork and beans, the retortable vessel is a 16 wt. oz., 300×406, tin plated can with enamel lining, and the retort operation is carried out in a still retort, the pork and beans in the sealed can have to be heated at a minimum temperature of 120° C. for a minimum period of time of 50 minutes. When the legume-containing mixture is baked beans, the retortable vessel is a 16 wt. oz., 300, tin plated can with enamel lining, and the retort operation is carried out in a still retort, the baked beans in the sealed can have to be heated at a minimum temperature of 120° C. for a minimum period of time of 80 minutes. When the legume-containing mixture is chili and beans, the retortable vessel is a 16 wt. oz., 300, tin plated can with enamel lining, and the retort operation is carried out in a still retort, the chili and beans in the sealed can have to be heated at a minimum temperature of 120° C. for a minimum period of time of 72 minutes.

The retort operation can be carried out in any retort equipment known to those skilled in the art. Examples of useful retort equipment include, but are not limited to, hydrostatic retorts, crateless retorts, rotary retorts, agitated retorts, and still retorts. As will be appreciated by one skilled in the art, and as already pointed out herein, the time and temperature parameters necessary to prepare a commercially sterile product will depend upon the type of retort equipment used.

After cooling, the retortable vessels are ready for distribution to the consumer. The invention may be applied to cans retorted, or processed, under pressure and water or in pure saturated steam by various sterilization procedures; for example, batch type, non-agitating, vertical or horizontal retorts (still retorts).

The product of the invention has excellent color, flavor, texture and appearance. The cooked legumes are firm, yet tender, and do not fall apart or sloth their seed coats. The primary advantage of the present invention is that, even for legumes which would normally require soaking periods up to 24 hours to render them quick-cooking, soaking periods are reduced to a fraction of that time required in the prior art, representing a savings of 50–90% over the normal time. Thus, soaking tanks can be utilized at an hourly rather than a daily basis. The shorter hydration times require less labor and increase plant capacity by improving utilization of processing equipment. In addition, increased equipment usage will lower amortization times and thus decrease net capital equipment cost. This is accomplished by the preconditioning of the dry legumes to produce a pretreated legume. While not intending to be bound by theory, it is unexpected and surprising that such a conditioning step would produce a legume which can be hydrated in the rapid manner of the legumes in the present invention.

A further benefit of the present invention is that, while the art does teach methods for reducing soaking periods and rendering legumes quick cooking, such other methods require elaborate hydration mediums. For example, U.S. Pat. No. 4,729,901, already referred to herein, requires the preparation of a hydration medium which contains numerous agents such as sodium carbonate and sodium bicarbonate and must have a pH within a narrow range. The process of the present invention does not have such a requirement.

The present invention also relates to the shelf stable, packaged, legume containing product prepared by the process described herein.

The present invention is further illustrated, but not limited by, the following examples.

EXAMPLES

Example 1

Clean, dry navy beans (moisture 16%) are conveyed at a feed rate of 70 lb. per minute to a shaker table having a perforated bottom. The perforated bottom allows water to drain out the bottom of the shaker table. The navy beans are sprayed with 26° C. city water at a hardness of 30 ppm calcium. The water is sprayed through 6 spray nozzles, with each nozzle forming full cone coverage. The total feed rate of water is 25 lb. per minute. The residence time of the beans is 4 minutes. At the completion of this pretreatment step, the pretreated beans have a moisture content of 24%.

Three hundred eighty seven lb. of the pretreated beans are placed into 1,000 lb. of blanching water. The blanching water is 88° C. well water at a hardness of 180 ppm calcium, and is contained in a 150 gallon, agitated blanching tank. The tank is equipped with 6 steam injection spargers to maintain water at 85°±3° C. by injecting steam at 15 PSIG. After 5 minutes, the blanching water is drained through a screened drain hole.

After ½ of the blanching water is drained, room temperature tap water is introduced into the blanching tank. At the same time the tap water is introduced to the blanching tank, the bean slurry contained in the blanching tank is pumped to a water spray and separation bed. Beans are separated from the slurry in the separation bed, and are cooled to below 32° C. in the water spray. At this point the hydrated bean has a moisture content of 42% by weight and the weight of the 307 lb. of the pretreated beans has increased to 507 lb.

A sauce is separately prepared by blending tomato paste, water, sugar, corn syrup, salt, onion powder, and natural and artificial flavors in an agitated tank. Hot dogs are separately prepared by slicing whole hot dogs into ½ inch thick pieces.

The hot dog pieces, hydrated beans and sauce are then deposited into 307×205 plastic bowls with aluminum lids. The mixture contained in the plastic bowls contains 20% hot dogs, 18% hydrated beans, and 62% sauce. After being filled, the bowls are retorted in a rotary overpressure water spray retort for a total cook time of 35 minutes at 122° C., thereby providing a commercially sterile product. After being retorted, the bowls are cooled for 26 minutes.

What is claimed is:

1. A process for preparing a shelf-stable, packaged, legume-containing product, said process comprising:
   (a) preconditioning dry legumes by contacting said dry legumes with a sufficient amount of an initial water source and for a sufficient period of time to produce pretreated legumes having a moisture content in the range of from about 15 wt. % to about 35 wt. %;
   (b) hydrating said pretreated legumes by contacting said pretreated legumes with a sufficient amount of a secondary water source for a sufficient period of time to produce hydrated legumes having a moisture content in the range of from about 35 wt. % to about 55 wt. %, wherein said secondary water source is at a temperature in the range of from about 60° C. to about 95° C.;
   (c) combining said hydrated legumes with a vehicle, thereby producing a legume-containing mixture comprising from about 10 wt. % to about 55 wt. % of said hydrated legumes and a balance of said vehicle;
   (d) charging said legume-containing mixture into a retortable vessel;
   (e) sealing said retortable vessel; and
   (f) heating said legume-containing mixture in said sealed retortable vessel in a retort operation carried out at a temperature in the range of from about 110° C. to about 130° C. for a period of time in the range of from about 20 minutes to about 150 minutes, thereby producing a shelf-stable, packaged legume-containing product.

2. A process according to claim 1 wherein the dry legumes are selected from the group consisting of beans, lentils, soybeans, and mixtures thereof.

3. A process according to claim 2 wherein the dry legumes are beans.

4. A process according to claim 3 wherein the pretreated beans have a moisture content in the range of from about 22 wt. % to about 25 wt. %.

5. A process according to claim 4 wherein the initial water source has a hardness in the range of from about 5 to about 100 ppm calcium.

6. A process according to claim 5 wherein the initial water source is tap water and has a hardness in the range of from about 20 to about 40 ppm calcium.

7. A process according to claim 6 wherein the dry beans are preconditioned by spraying said dry beans with an initial water source, wherein the ratio of initial water source to dry beans is in the range of from about 2:1 to about 3:1 (initial water source: dry beans), and wherein the initial water source is allowed to stand on the sprayed dry beans for a period of time in the range of from about 2 to about 5 minutes.

8. A process according to claim 7 wherein the pretreated beans are hydrated by immersing said pretreated beans in a secondary water source, wherein the secondary water source is selected from the group consisting of tap water, de-ionized water, distilled water, and mixtures thereof, wherein the secondary water source has a hardness in the range of from about 30 to about 260 ppm calcium, wherein the ratio of secondary water source to pretreated beans is in the range of from about 3:1 to about 4:1 (secondary water source: pretreated beans), and wherein the pretreated beans are immersed in the secondary water source for a period of time in the range of from about 5 to about 20 minutes.

9. A process according to claim 8 wherein the secondary water source is tap water and has a hardness in the range of from about 150 to about 210 ppm calcium.

10. A process according to claim 9 wherein the temperature of said secondary water source during hydration is in the range of from about 80° C. to about 85° C.

11. A process according to claim 10 wherein the hydrated beans have a moisture content in the range of from about 40 wt. % to about 50 wt. %.

12. A process according to claim 11 wherein the legume-containing mixture comprises from about 20 wt. % to about 50 wt. % hydrated beans, and a balance of vehicle.

13. A process according to claim 12 wherein the vehicle is selected from the group consisting of water, brine, a tomato-based sauce, chili sauce, barbecue sauce, smoke-flavored sauce, and baked bean sauce.

14. A process according to claim 13 wherein the vehicle is selected from tomato-based sauce, chili sauce, and baked bean sauce.

15. A process according to claim 14 wherein the retortable vessel is selected from the group consisting of a tin can, an aluminum can, a glass bottle, a glass jar, and a plastic bowl with an aluminum lid.

16. A process according to claim 15 wherein the retortable vessel is selected from the group consisting of a tin can and an aluminum can.

17. A process according to claim 16 wherein the legume-containing mixture is pork and beans, wherein the retortable vessel is a 16 wt. oz., 305, tin plated can with enamel lining, wherein the retort operation is carried out in a still retort, and wherein the pork and beans in the sealed tin plated can are heated at a minimum temperature of 120° C. for a minimum period of time of 55 minutes.

* * * * *

UNITED STATES PATENT AND TRADEMARK OFFICE
CERTIFICATE OF CORRECTION

PATENT NO. : 5,545,425
DATED : August 13, 1996
INVENTOR(S) : Rei Young A. Wu

It is certified that error appears in the above-indentified patent and that said Letters Patent is hereby corrected as shown below:

Claim 1, column 9, line 29, please add ", wherein the water source is selected from the group consisting of tap water, de-ionized water, distilled water, and mixtures thereof" between "35 wt. %" and ";"

Claim 1, column 9, line 37, please add ", the water source is selected from the group consisting of tap water, de-ionized water, distilled water, and mixtures thereof" between "95°C" and ";"

Signed and Sealed this

Sixteenth Day of September, 1997

*Attest:*

BRUCE LEHMAN

*Attesting Officer*   *Commissioner of Patents and Trademarks*